UNITED STATES PATENT OFFICE.

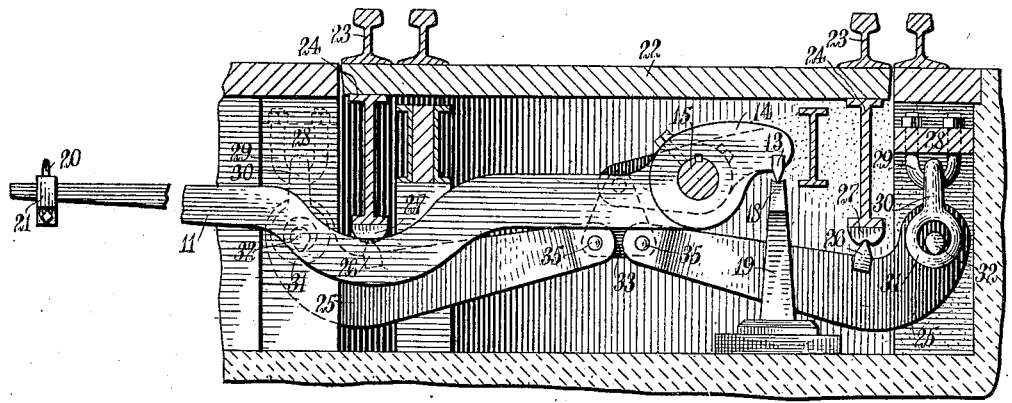

CHARLES MERCER STURGIS, OF BIRMINGHAM, ALABAMA.

WEIGHING-SCALE.

993,906.  Specification of Letters Patent.  Patented May 30, 1911.

Application filed August 29, 1910. Serial No. 579,371.

*To all whom it may concern:*

Be it known that I, CHARLES M. STURGIS, a citizen of the United States, and a resident of Birmingham, in the county of Jefferson and State of Alabama, have invented a new and Improved Weighing-Scale, of which the following is a full, clear, and exact description.

Among the principal objects which the present invention has in view are: to provide a balancing mechanism for a scales platform which is simplified, economical and durable; to provide in a construction of the character described a rocking beam extensible at a cost proportionate to the dimension; and to provide a scale beam lever which is constructed and arranged to support in part the weight of the rocking shaft.

One embodiment of the present invention is disclosed in the structure illustrated in the accompanying drawings, in which like characters of reference denote corresponding parts in all the views, and in which—

Figure 1 is a vertical cross section of a weighing scales mechanism and a pit therefor, constructed and arranged in accordance with the present invention; Fig. 2 is a longitudinal section in plan, and on a reduced scale, of a balancing mechanism constructed and arranged in accordance with the present invention; Fig. 3 is a detail view, on an enlarged scale, of a bracket arm and lever connecting plate therefor; Fig. 4 is a detail view, on an enlarged scale, of the rocking bar of the balancing mechanism and connecting collars therefor, Fig. 5 is a detail view, on an enlarged scale, of a supporting arm and knife edge pivot therefor employed to support the scale beam lever; and Fig. 6 is a detail view, on an enlarged scale, of a modified form of the rocking bar shown in conjunction with the scales beam lever employed in the present invention.

The present invention is an improvement upon the construction shown in an application for patent upon weighing scales filed by me the 19th day of April, 1910, and bearing Serial No. 556369, to which cross reference is here made.

The weighing scales lever 11 in the present invention is provided with a supporting head 12. The supporting head 12 is extended and provided with a down-turned knife edge pivot 13. The pivot 13 mounted on the head 12 is alined with the pivots 13 mounted on the ends of short supporting arms 14, 14. The arms 14, 14 are usually arranged in pairs, as shown in Fig. 2 of the drawings, and are secured to a rocking bar 15 by means of feathers 16, and are prevented from shifting laterally thereon by set screws 17. By this construction the arms 14, 14 may be applied to the bar 15 at any convenient point thereon without reference to the other devices supported on the said bar 15. The arms 14, 14 and the head 12 form the supports for the rocking bar 15, and the knife edge pivots 13, 13 depended from each of the said arms rest upon pivot plates 18, 18 disposed at the top of posts 19, 19. The posts 19, 19 are preferably constructed of masonry, and are erected upon the bottom of the scales pit, as seen in Figs. 1 and 2 of the drawings.

The scales beam lever 11 is connected by means of an eyelet 20 on an adjusting block 21, with a platform scales steelyard, whereon the weighing devices are adjusted for balancing the weighing scales. The platform 22 in the present invention is shown as having railway track rails 23, 23 mounted thereon, the drawings showing the invention as applied to what is known as a railway scales. The platform 22 is supported upon heavy beams 24, 24, which beams are extended lengthwise of the platform and parallel with the rocking bar 15. The said beams are supported upon levers 25, 25 and upon knife edge pivots 26, 26 mounted thereon, as shown best in Fig. 1 of the drawings. To rest upon the pivots 25, 25 the beams are provided with shoes 27, 27 the under surfaces whereof are preferably grooved, as shown in the drawings.

The levers 25, 25 are suspended from the rocking bar 15 on the one end and from plates 28, 28 on the other end. The plates 28, 28 and the said levers 25, 25 are connected by means of staples 29, 29 and swinging loops 30, 30. The loops 30, 30 are each provided with two eyelets 31, 31, which are provided to fit over and form a bearing for the knife edge pivots 32, 32. The pivots 32, 32 are extended through the body of the levers 25, 25 and are fixedly held therein. In this manner is supported the outer end of each of the levers 25.

The levers 25, 25 are arranged in pairs, alined transversely to the pit so that the inner ends of each of the said levers extend to the median line of the said pit to engage a triangular plate 33. The levers 25, 25 are preferably bifurcated to form heads 34, 34, between the wings of which heads the said plate 33 extends. Fixedly mounted in and extended through the sides of the heads 34 are knife edge pivots 35, 35. The pivots 35, 35 are extended through perforations 36, 36 in the plate 33. The perforations 36, 36 are enlarged to permit the pivots 35, 35 to rock therein. The plate 33 is suspended from lever arms 37, which arms are connected with the rocking bar 15 by means of feathers 38, as shown best in Fig. 3 of the drawings. The arms 37, 37 may be disposed at any point upon the rocking bar 15, being secured thereto only by the feathers 38 and set screws 39.

The construction thus far described whereby the arms 14, 12 and 37 are mounted on the rocking bar 15, provides for varying the construction of the scales to sizes great or small, as may be desired, all that is necessary to vary the size being to add shaft sections of greater or lesser length, or of greater number to form the rocking bar 15. The shaft sections forming the rocking bar 15 are united by means of collars 40, 40. The collars 40, 40 are slidably mounted on the shaft sections forming the bar 15, and are non-rotatably secured thereon by means of feathers 41, 41. The collars 40, 40 are provided with tapered grooves 42 to receive a tapered key 43. The grooves 42 aline to receive the said keys 43, and are held in united relation by screw bolts 44, 44. The collars 40 are each provided with a set screw 45 which prevents the shifting of the collars longitudinally on the shaft sections.

By means of the construction wherein are used shaft sections and the collars 40, 40, the said sections may be cut to suit the pit of weighing scales construction.

In the modified form shown in Fig. 6 of the drawings, the shaft sections forming the rocking bar 15 are substituted by Z-bars 46. The Z-bars 46 are of any suitable length, and are preferably connected to the arms 12, 14 and 37 by angle plates 47, 47, which are bolted to the Z-bars and to the said arms, as shown best in Fig. 6 of the drawings.

Having thus described my invention, what I claim as new and desire to secure by Letters Patent is:—

1. A weighing scales, comprising a rocking bar embodying a plurality of longitudinally extended sections; a plurality of collars for uniting said sections, said collars being keyed to said sections and provided with tapered grooves arranged to aline; and a tapered key arranged to be driven into said grooves when alined.

2. A weighing scales, comprising a rocking bar embodying a plurality of longitudinally extended sections; a plurality of collars for uniting said sections, said collars being keyed to said sections and provided with tapered grooves arranged to aline; and a tapered key arranged to be driven into said grooves when alined.

3. A weighing scales, comprising a rocking bar embodying a plurality of longitudinally extended sections; a plurality of collars for uniting said sections, said collars being keyed to said sections and provided with tapered grooves arranged to aline; a tapered key arranged to be driven into said grooves when alined; a scales beam lever fixedly mounted on said rocking bar; a short supporting head for said lever having a pivot fixedly mounted on said rocking bar; a plurality of short supporting arms for said rocking bar, said arms being provided with perforated ends adapted to slide over said sections; a plurality of knife edge pivot points one mounted on each of said supporting arms at equal distance from the center of the perforation formed in the end thereof; means for preventing the rotation of said arms on said sections; a plurality of pivot posts erected on the scales structure, and having seats for said pivot members to hold the same in alinement; and suitable connections between said lever and the steelyard of the scales.

4. A weighing scales, comprising a rocking bar embodying a plurality of longitudinally extended sections; a plurality of collars for uniting said sections, said collars being keyed to said sections and provided with tapered grooves arranged to aline; a tapered key arranged to be driven into said grooves when alined; a scales beam lever fixedly mounted on said rocking bar; a short supporting head for said lever having a pivot fixedly mounted on said rocking bar; a plurality of short supporting arms for said rocking bar, said arms being provided with perforated ends adapted to slide over said sections; a plurality of knife edge pivot points one mounted on each of said supporting arms at equal distance from the center of the perforation formed in the end thereof; means for preventing the rotation of said arms on said sections; a plurality of pivot posts erected on the scales structure, and having seats for said pivot members to hold the same in alinement; suitable connections between said lever and the steelyard of the scales; a plurality of supporting arms slidably mounted on said rocking bar;

means for fixing the adjustment of said arms upon said rocking bar; and a plurality of supporting levers for the scales platform pivotally connected with the fixed structure and with said supporting arms extended from said rocking bar.

In testimony whereof I have signed this specification in the presence of two subscribing witnesses.

CHARLES MERCER STURGIS.

Witnesses:
JAS. N. MERRELL,
LILLIAN CREWS.

Copies of this patent may be obtained for five cents each, by addressing the "Commissioner of Patents, Washington, D. C."